United States Patent [19]

Corbefin et al.

[11] 4,390,940
[45] Jun. 28, 1983

[54] PROCESS AND SYSTEM FOR PRODUCING PHOTOVOLTAIC POWER

[75] Inventors: René Corbefin, Mondonville; Gabriel Vacelet, Pibrac, both of France

[73] Assignee: Societe Nationale Industrielle Aerospatiale, Paris, France

[21] Appl. No.: 273,267

[22] Filed: Jun. 12, 1981

[30] Foreign Application Priority Data

Jun. 26, 1980 [FR] France ................ 80 14235

[51] Int. Cl.$^3$ .......................................... H02M 7/537
[52] U.S. Cl. .................................... 363/132; 363/98; 323/906
[58] Field of Search ............. 363/17, 26, 41, 131–132, 363/97–98; 323/283, 285, 906; 307/150, 151

[56] References Cited

U.S. PATENT DOCUMENTS 3,384,806 5/1968 Hartman ................ 323/906 X
4,200,833 4/1980 Wilkerson ................ 323/283

OTHER PUBLICATIONS

Landsman, "Maximum Power Trackers for Photovoltaic Arrays", 13th IEEE Photovoltaic Specialists Conference-1978, Washington, D.C., U.S.A. (Jun. 5-8, 1978), pp. 996-1000.
Franx, "A New Approach to Solar Pump Systems Using Submersible Motors", Photovoltaic Solar Energy Conference, Berlin, W. Germany, Apr. 79, pp. 1038-1046.
Becker, "Designing Microprocessor-Controlled PWM Inverters," Proceedings of Powercon 5, Fifth National Solid State Power Conversion Conference, San Francisco, Ca. USA (May 4-6, 1978), D3-1-6.
Kapustka et al., "A Programmable Power Processor for a 25 KW Power Module", PZSC '78 Record, Syracuse, N.Y., USA (Jun. 13-15, 1978), pp. 76-80.
Corbett, "Development of High Voltage High Power Satellite Power System", Proceedings of the 13th Intersociety Energy Conv. Engineering Conference, San Diego, Ca., USA (Aug. 20-20, 1978), pp. 37-43.
Pickrell et al., "An Invertor/Controller Subsystem Optimized for Photovoltaic Applications", Thirteenth IEEE Photovoltaic Specialists Conference-1978, Washington, D.C., USA (Jun. 5-8, 1978), pp. 984-991.

Primary Examiner—William M. Shoop
Assistant Examiner—Peter S. Wong
Attorney, Agent, or Firm—Merriam, Marshall & Bicknell

[57] ABSTRACT

The invention relates to a process and system for obtaining the maximum power from an assembly of photovoltaic cells. According to the invention, the D.C. power furnished by said assembly is converted, with the aid of a converter controlled by a modulated signal, into an A.C. power, and the value of the rate of modulation corresponding constantly to the maximum power, is determined for example with the aid of a microprocessor. The invention is applicable to the generation of solar energy with coupling on the network of a converter.

10 Claims, 5 Drawing Figures

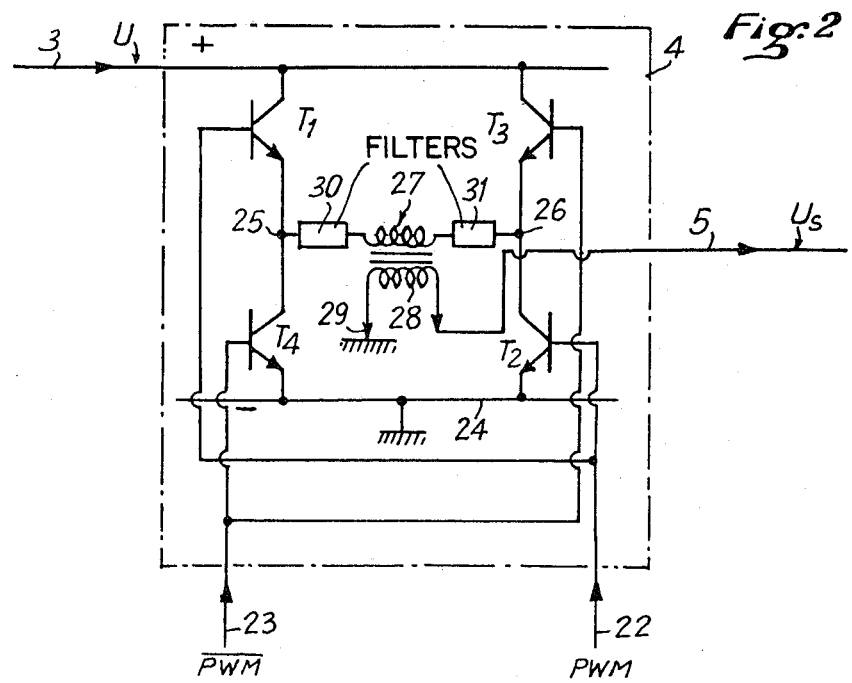

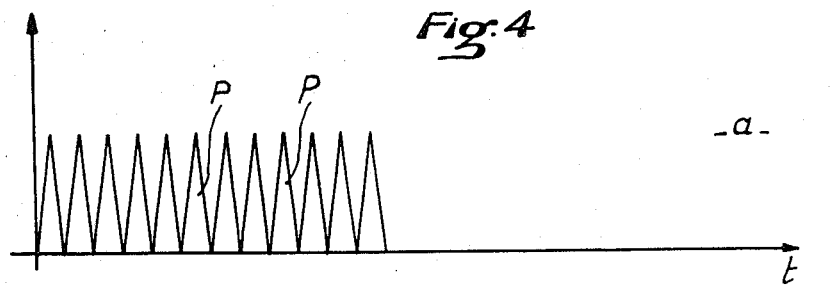
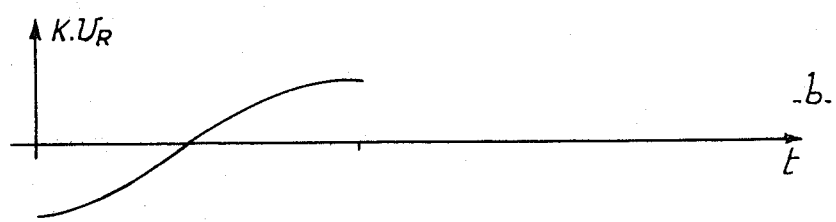
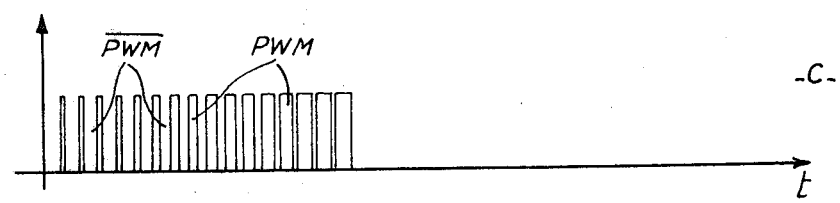
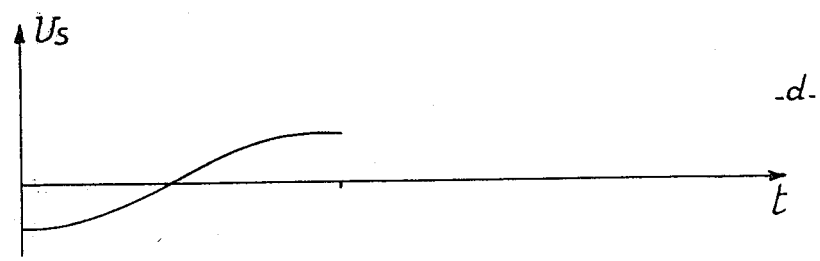
Fig. 4
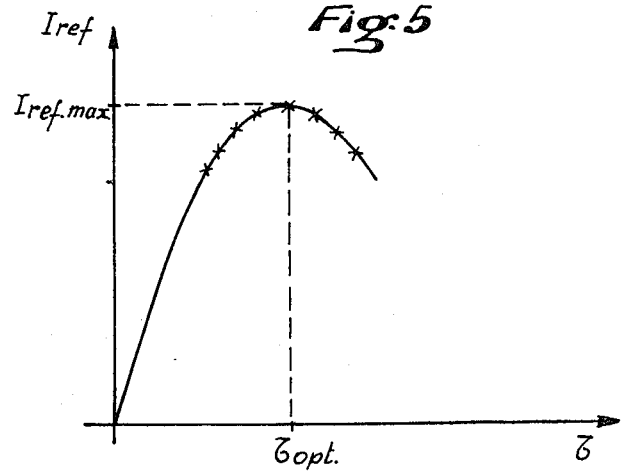
Fig. 5

PROCESS AND SYSTEM FOR PRODUCING PHOTOVOLTAIC POWER

The invention relates to a process and a system for producing electrical energy from an assembly of photovoltaic cells.

It is known that electrical energy of photovoltaic origin is at present very expensive. It is therefore very important for a system for producing photovoltaic power to operate, at every instant, at its maximum power.

Furthermore, it is known that the power furnished by an assembly of photovoltaic cells depends, inter alia, on the insolation and orientation of said assembly. Assuming that the orientation, with respect to the solar rays, is adjusted as best possible, a maximum power obtainable therefore exists for every value of insolation. For a given value of insolation, the power furnished by an assembly of photovoltaic cells presents, in a system of current-voltage axes, the approximate form of the branch of a hyperbola, such that the voltage is the greater as the current is weak and vice versa. Thus, to adjust the operating point of an assembly of photovoltaic cells to its maximum power, the present insolation might be permanently measured, then the characteristic curves of this assembly might be used for approaching as best possible the maximum theoretical power obtainable. To this end, it would suffice to provide an auxiliary photovoltaic reference cell furnishing a measurement of the present insolation.

However, such a method of regulation could not be satisfactory. In fact, it may already be noted that, particularly in the case of the reference cell being remote from said assembly of cells, and in particular for practical reasons of electrical circuits, the measurement of the insolation might be different from the insolation actually received by said assembly. Moreover, this auxiliary reference cell could not take into consideration the state of cleanliness and operating temperature of said assembly of cells, which nevertheless constitute important parameters of the power furnished by said assembly of cells.

It is an object of the present invention to provide a process and a system for permanently seeking the operating point at maximum power, whatever the insolation of this assembly, its orientation, state of cleanliness and operating temperature, without using the characteristic voltage-current and power-temperature curves of said assembly.

To this end, according to the invention, the process for obtaining the maximum power from an assembly of photovoltaic cells is noteworthy in that the D.C. power furnished by said assembly is converted, by means of a converter controlled by a modulated signal, into an A.C. power and, sequentially, a first phase, during which the rate of modulation of said signal is varied by causing it to take a plurality of values encompassing the present value, the power actually furnished by the converter is measured or calculated for each of said values and the value of the rate of modulation corresponding at that moment to the maximum of this power is determined, is alternated with a second phase during which the rate of modulation is adjusted to said value.

Thus, if at an instant $t_1$ the rate of modulation of the control signal of the converter is $\tau_1$ and corresponds to a power actually furnished by the converter equal to $P_1$, at instant $t_2 > t_1$, $\tau_1$ is varied by causing it to take values $\tau_1 + \Delta\tau$, $\tau_1 + 2\Delta\tau$, $\tau_1 + 3\Delta\tau$, ... $\tau_1 + n\Delta\tau$ and $\tau_1 - \Delta\tau$, $\tau_1 - 2\Delta\tau$, ... $\tau_1 - n\Delta\tau$. For each of these $2n$ values of the rate of modulation, the power actually furnished by the converter is measured or calculated, with the result that $2n$ values are obtained for the power. From these $2n$ power values, and the initial value $P_1$, the highest is chosen, the value $\tau_1 + i. \Delta\tau$ (with $i$ being equal to $-n$, $-(n+1)$, $-(n+2)$..., $-2$, $-1$, $0$, $1$, $2$, ... $n-1$, $n$) of the rate of modulation to which this highest value of the power corresponds, is located and this rate of modulation $\tau_1 + i. \Delta\tau$ is imposed on the control signal of the converter during the time slot $\Delta t$. At instant $t_2 + \Delta t$, the same operations are recommenced from this value $\tau_1 + i. \Delta\tau$.

Due to the invention, the maximum power available may be permanently obtained without taking into consideration the characteristic curves of the assembly of said photovoltaic cells.

The modulated control signal of the converter preferably results from the modulation of a signal constituted by an uninterrupted series of identical triangular pulses with symmetrical linear edges, by a sine signal of power frequency, so that said modulated signal is constituted by pulses of the same amplitude but of variable duration as a function of the amplitude presented by said sine signal at the moment when each of them is produced.

It will be noted that this arrangement is particularly advantageous as it allows the coupling of said converter on an energy network capable both of collecting the excess power not consumed by a load supplied by the converter and of furnishing any necessary additional power to this load in the case of insufficient supply of power by the converter. In fact, it then suffices that the modulation sine signal be furnished by this network. Frequency and phase synchronism of the voltage at the output of the converter on the voltage of the network is automatically obtained.

Moreover, the amplitude of the voltage at the output of the converter must, of course, be equal to that of the network. To this end, on the one hand, an assembly of photovoltaic cells and a converter are chosen, capable of furnishing, at the output of the latter, a voltage whose amplitude is at least approximately equal to that desired and, on the other hand, the amplitude of this output voltage of the converter is adjusted by acting on the rate of modulation of the control signal of the converter. It will be noted that, in this case, the output voltage of the converter being imposed, the regulation of power according to the invention amounts to a regulation of current, in order to obtain at the output of the converter the current of maximum possible intensity, taking into account the value imposed on the voltage.

For carrying out the invention, a system is provided which comprises an assembly of photovoltaic cells and a D.C.-A.C. converter converting the D.C. power produced by said assembly into A.C. power and noteworthy in that said converter is of the type able to be controlled by a control signal, which determines the rate of conversion of the D.C. power into A.C. power, and in that said system further comprises, on the one hand, a modulator delivering at its output a modulated signal acting as control signal for said converter and whose rate of modulation regulates said rate of conversion, and, on the other hand, a processor calculating by iteration the maximum power available at the output of said converter and consequently controlling said rate of modulation signal. When this system is intended to be connected to a network, said processor imposes a rate of modulation of the signal giving, at the output of the converter, an A.C. voltage of amplitude, frequency and phase at least approximately equal to those of the A.C. voltage of the network and an A.C. current of maximum intensity, taking into account the value of this A.C. output voltge of the converter. It is then particularly advantageous if the modulator receives the A.C. voltage of the network as modulation signal.

The converter is advantageously of the type with chopping by electronic elements with controlled conduction and it comprises at its output filtering means and a transformer adjusting the shape and amplitude of the A.C. output voltage. The processor calculates by iteration a reference current which it imposes as output current on the converter, by adjustment of the rate of modulation of the control signal of the converter.

The invention will be more readily understood on reading the following description with reference to the accompanying drawings in which:

FIG. 1 is a block diagram of a system for producing photovoltaic power according to the invention.

FIG. 2 schematically shows the D.C.-A.C. converter of the system of FIG. 1.

FIG. 3 gives the block diagram of the electronic control device of the system of FIG. 1.

FIG. 4 shows signals, illustrating the operation of the system according to the invention.

FIG. 5 illustrates the operation of the processor of the system according to the invention.

In these figures, like references designate like elements.

Figure 1:
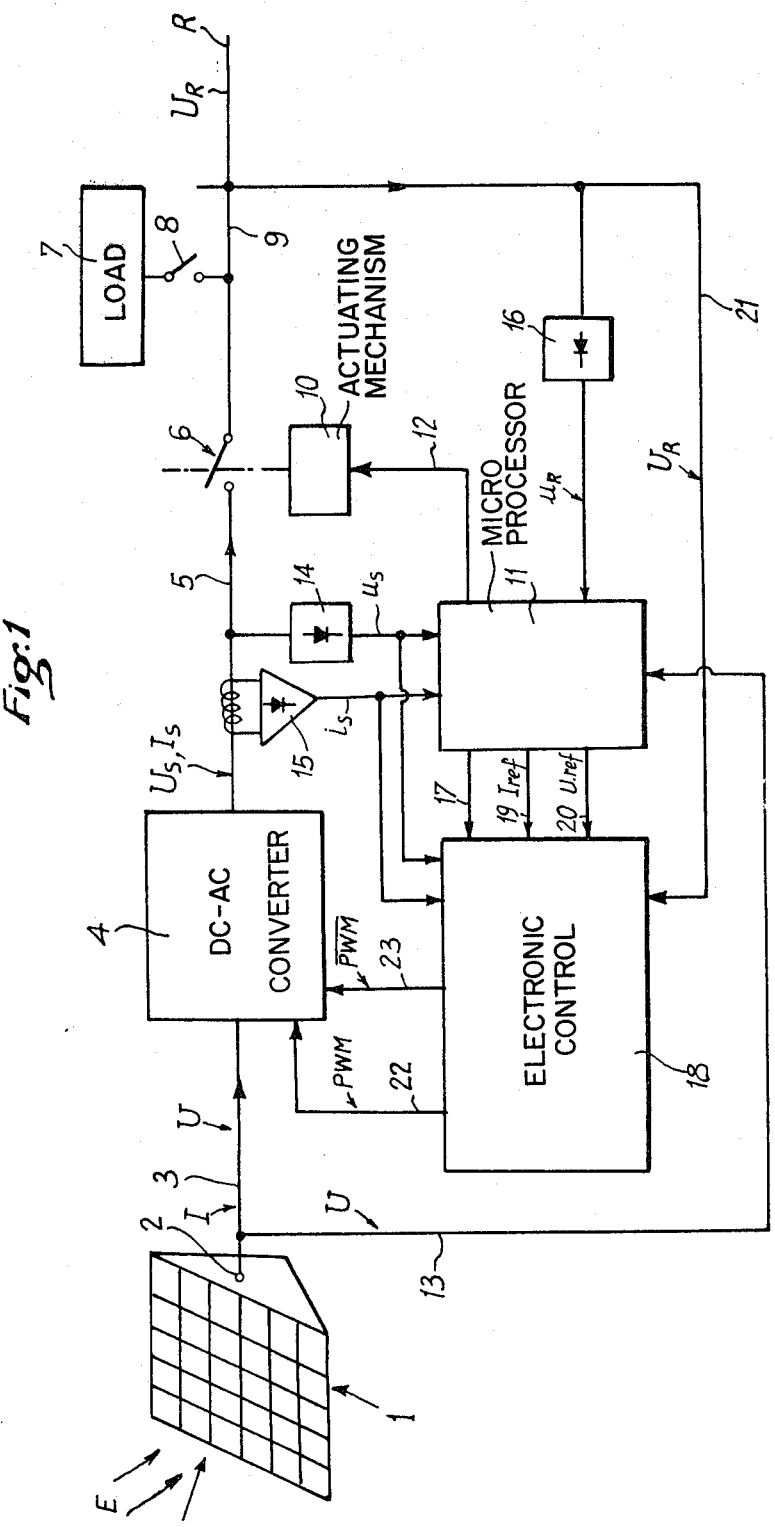

Referring now to the drawings, the system for producing photovoltaic power according to the invention, illustrated in FIG. 1, comprises an assembly of photovoltaic cells 1 receiving solar energy E and delivering at its output 2 a D.C. voltage U and a D.C. current I. The number of the photovoltaic cells of the assembly I and the interconnection thereof (series-parallel) are chosen so as to furnish, as a function of the solar energy E received, at least the desired power under voltage U, included for example between 150 and 180 V.

The output 2 of the assembly 1 is connected, by a line 3, to a D.C.-A.C. converter 4, which therefore receives the D.C. power under D.C. voltage U. It converts the D.C. power into an A.C. power under the A.C. voltage $U_s$ which it may inject into a network R, via a line 5 and a switch 6 which is mounted in series in said line 5 and which forms the output of the system according to the invention.

A load 7 may be connected, via a switch 8, to line 9 effecting the link between the switch 6 and the network R.

The opening or closure of this switch 6 is controlled by an actuating mechanism 10, itself controlled by a microprocessor 11, via a line 12. The microprocessor 11 receives, respectively via a line 13, a rectifier 14, and intensity transformer-rectifier 15 and a rectifier 16, the D.C. voltage U delivered by the assembly 1 of the photovoltaic cells, a D.C. voltage $u_s$ image of the A.C. voltage $U_s$ coming from the converter 4, a D.C. intensity $i_s$ image of the A.C. intensity $I_s$ coming from said converter and a D.C. voltage $u_R$ image of the A.C. voltage $U_R$ of the network R.

Via a connection 17, the microprocessor controls the operation of an electronic control device 18 to which it furnishes, via a link 19, a D.C. reference intensity $I_{ref}$ and via a link 20 a D.C. reference voltage $U_{ref}$, as will be seen hereinafter.

Furthermore, the electronic control device 18 receives, respectively from the rectifier 14 and from the transformer-rectifier 15, the images $u_s$ and $i_s$, and, via a line 21, the A.C. voltage $u_R$ of the network R.

The electronic device addresses to the converter 4, respectively via links 22 and 23, a control signal PWM and its inverse $\overline{PWM}$, which control the operation of said converter in the manner described hereinafter.

The converter 4 may present the structure shown in FIG. 2. It comprises four power transistors $T_1$, $T_2$, $T_3$ and $T_4$. The emitter-collector paths of the transistors $T_1$ and $T_4$, on the one hand, $T_2$ and $T_3$ on the other hand, are mounted in series and the two branches of emitter-collector paths thus constituted are mounted in parallel on one another, between the line 3 conveying the D.C. power coming from the assembly 1 of the photovoltaic cells and the D.C. earth 24 of the system. The bases of the transistors $T_1$ and $T_2$, disposed diagonally, are connected to line 22 conveying the signal PWM, whilst the bases of the transistors $T_3$ and $T_4$, also disposed diagonally, are connected to line 23 conveying the signal $\overline{PWM}$. Between point 25, common to transistors $T_1$ and $T_4$, and point 26, common to transistors $T_2$ and $T_3$, there is mounted the primary winding 27 of a transformer, whose secondary winding 28 has one end connected to the line 5 to furnish said latter with voltage $U_s$, the other end of said secondary winding 28 being connected to A.C. earth 29. Between points 25 and 26, on the one hand, and the primary winding 27 on the other hand, are provided filters 30 and 31 respectively.

Thus, when the transistors $T_1$ and $T_2$ are simultaneously rendered conducting by the signal PWM, the current passing therethrough and produced by the voltage U, passes through the primary winding 27, from point 25 towards point 26, producing a portion, for example positive, of the voltage $U_s$. Inversely, when the transistors $T_3$ and $T_4$ are simultaneously rendered conducting by the signal $\overline{PWM}$, the current passing therethrough and produced by the voltage U, passes through the primary winding 27, from point 26 towards point 25, producing a portion, for example negative, of the voltage $U_s$.

As the pulses PWM and $\overline{PWM}$ are two signals in phase opposition each modulated in width, as long as the width of the pulses $\overline{PWM}$ is greater than that of the pulses PWM, the device 18 addresses to the converter 4 a positive mean value. Inversely, when the width of the pulses $\overline{PWM}$ is greater than that of pulses PWM, the device 18 addresses a negative mean value to the converter 4.

The converter 4 of FIG. 2 therefore enables an A.C. voltage $U_s$ to be obtained from the D.C. voltage U, depending on the signals PWM and $\overline{PWM}$. The filters 30 and 31 are for example of the LC type and they allow the shaping of the voltage $U_s$ (cf. diagrams c and d of FIG. 4). The output transformer 27,28 enables galvanic insulation and voltage matching to be effected.

The electronic control device 18, shown in FIG. 3, comprises a triangular signal generator 32, a sine signal generator 33, a modulator 34, a regulation device 35 and a safety device 36.

The generator 32 is of any known type and it produces a signal constituted by an uninterrupted series of triangular pulses P (cf. diagram a of FIG. 4), of which the leading and trailing edges are linear and symmetrical. The series of pulses P is directly applied to one of the inputs 34a of the modulator 34.

The sine generator 33 receives, via line 21, the A.C. voltage $U_R$ of the network and its role may be limited, in the case of a monophase system, to transmitting this voltage $U_R$ to the regulation device 35. The latter comprises an amplifier 37 of adjustable gain K, of which the input receives the voltage $U_R$ and of which the output, which constitutes the output of the device 35, is connected to the other input 34b of the modulator 34. This regulation device 35 comprises, moreover, two comparators 38 and 39, whose outputs are connected to the gain control input of the amplifier 37 via a logic gate 40 of OR type.

The comparator 38 receives, on one of its inputs, the D.C. current $i_s$ image of the A.C. current $I_s$ and, on its other input, the reference current $I_{ref}$ delivered in the manner described hereinafter, by the microprocessor 11. Similarly, the comparator 39 receives, on one of its inputs, the D.C. voltage $u_s$ image of the A.C. voltage $U_s$ and, on its other input, the reference voltage $U_{ref}$, delivered in the manner described hereinafter by the microprocessor 11. Thus, at their outputs, the comparators 38 and 39 deliver difference signals $I_{ref}-i_s$ and $U_{ref}-u_s$ which are possibly combined by the OR gate 40 to control the gain of the amplifier 37.

The amplitude of the A.C. voltage $K.U_R$ applied to the input 34b of the modulator 34 (cf. diagram b of FIG. 4) therefore depends on each of these error signals, separately or in combination.

The modulator 34, which may be of any known type, furnishes at its outputs connected to lines 22 and 23, the signals PWM and $\overline{PWM}$ respectively (cf. diagram c of FIG. 4) obtained by modulation of the triangular signal composed of the pulses P by the sine signal $K.U_R$ of variable amplitude. By this modulation, the pulses P whose fixed frequency is for example of the order of 3 KHz, are converted into pulses modulated in width as a function of the amplitude of the signal $K.U_R$. The diagrams of FIG. 4 show that, due to the structure of the circuit, the output voltage $U_s$ of the converter 4 is synchronised in phase and in frequency with the voltage $K.U_R$, i.e. with the voltage $U_R$ of the network. If "rate of modulation" denotes the ratio of the amplitude (variable) of the sine signal $K.U_R$ and the amplitude (fixed) of the triangular pulses P, it is seen that the rate of modulation $\tau$ makes it possible to play on the output voltage of the converter 4.

In no load state, i.e. when the switches 6 and 8 are open, the current $I_s$ is zero and the microprocessor is informed of this by the intensity transformer-rectifier 15. In this case, it is interested only in the regulation of the voltage $U_s$. To this end, it imposes a reference voltage $U_{ref}$, equal to voltage $u_R$, image of the voltage $U_R$ of the network. Subsequently, by the chain 39, 40,37,34,4 and 14 it controls the rate of modulation $\tau$ by a value corresponding to an output voltage $U_s$ of the converter 4 equal to $U_R$.

When operating with a load, when the switches 6 and 8 are closed, the microprocessor 11 continues its voltage regulation and the voltage $U_s$ is arranged to be slightly greater than the voltage $U_R$ of the network for the current $I_s$ to pass from converter 4 towards the network R. In addition, the microprocessor 11 sequentially calculates, by iteration, the power available at the output of the converter 4, for different values of the rate of modulation $\tau$ and it fixes its reference $I_{ref}$, at maximum level (cf. FIG. 5), by imposing on the rate of modulation $\tau$ the corresponding optimal value $\tau_{opt}$. The microprocessor 11 therefore obliges the converter 4, and therefore the assembly of cells 1, permanently to furnish the maximum power possible. It will be noted that the system is particularly stable. In fact, if the current $I_s$ increases, this results in a decrease in the difference signal $I_{ref}-i_s$ and therefore a decrease in the voltage $U_s$: the voltage $U_R$ of the network of the network R becomes greater than $U_s$ and the network tends to deliver into converter 4, which causes $I_s$ to drop. Inversely, if the current $I_s$ decreases, the rate of modulation $\tau$ increases, this bringing about an increase in the voltage $U_s$, as well as in the current $I_s$.

If the illumination of the photovoltaic cells of the assembly 1 became insufficient to ensure maintenance of the voltage $U_s$ at the output of the converter 4 at the desired level, the microprocessor would be informed of this by the line 13 and it would control the stoppage of the system by controlling the safety device 36, through line 17, as well as the opening of the switch 6, via the device 10. The safety device 36 may, by the input means 41 receive other control orders, concerning for example the heating of the cells of assembly 1, or the general stop start orders.

The system according to the invention therefore makes it possible:

to regulate the A.C. current to obtain a unidirectional transfer of the maximum power of the converter towards the network;

permanently to seek the operating point at maximum power, without employing the characteristics peculiar to the photovoltaic cells.

Although a monophase system has been described in the above example, it is obvious that the present invention may furnish polyphase energy. In this case, the transformer 27,28 ensures the indispensable galvanic insulation, whilst the sine generator 33 makes it possible to distribute the signals for controlling three monophase converters 34, respecting the phase shift of 120° between them.

Calculation by iteration of the microprocessor is effected, during operation, around an immediately preceding value of $I_{ref}$.

It is therefore advantageous to provide a special starting up sequence enabling the sine signal to be progressively established and consequently a regular increase of the rate of modulation $\tau$ up to an optimal values to be obtained.

What is claimed is:

1. Process for obtaining the maximum power from an assembly of photovoltaic cells, comprising the steps of:
 (a) converting the D.C. power furnished by said assembly into an A.C. power P by means of a converter controlled by a modulated signal having a rate of modulation $\tau$, the power actually furnished by said converter at an instant $t_1$ being $P_1$, and the corresponding rate of modulation being $\tau_1$;
 (b) at an instant $t_2 > t_1$, varying the rate of modulation $\tau_1$ by causing it to take the 2n values $\tau_1 + \Delta\tau$, $\tau_1 + 2\Delta\tau, \ldots, \tau_1 + n\Delta\tau$, and $\tau_1 - \Delta\tau, \tau_1 - 2\Delta\tau, \ldots, \tau_1 - n\Delta\tau$;
 (c) determining for each of said 2n values of the rate of modulation, the power actually furnished by said converter;
 (d) choosing from among said 2n values of P and said initial value $P_1$, the highest value $P_M$;
 (e) noting the value $\tau_M$ of the rate of modulation corresponding to said highest value $P_M$;
 (f) imposing said modulation rate $\tau_M$ on the control signal of said converter during a time slot $\Delta t$; and (g) at the instant $t_2+\Delta t$, repeating steps b, c, d, e, and f.

2. The process of claim 1, wherein the modulated control signal of the converter results from the modulation of a signal constituted by an uninterrupted series of identical triangular pulses with symmetrical linear edges, by a sine signal of lower frequency, so that said modulated signal is constituted by pulses of the same amplitude, but of variable duration as a function of the amplitude presented by said sine signal at the moment when each of them is produced.

3. The process of claim 2, in which said converter is coupled to a network, wherein said modulation sine signal is furnished by said network.

4. The process of claim 3, wherein the assembly of photovoltaic cells and the converter are chosen to be capable of furnishing at the output of said converter, an A.C. voltage whose amplitude is at least approximately equal to that of the network, the amplitude of this output voltage of the converter is adjusted by action on the rate of modulation of the control signal of the converter and the intensity of the output current of the converter is controlled by the maximum intensity, taking into account the value imposed on said output voltage.

5. The process of claim 2, wherein the variation of the rate of modulation is effected by varying the amplitude of the modulation sine signal.

6. A system for producing photovoltaic power comprising an assembly of photovoltaic cells and a D.C.-A.C. converter transforming the D.C. power produced by said assembly into A.C. power, wherein said converter is controlled by a control signal which determines the rate of conversion of the D.C. power into A.C. power, and said system further comprises a modulator delivering at its output a modulated signal acting as control signal for said converter and of which the rate of modulation regulates said rate of conversion, a processor for determining by iteration the modulation rate which results in maximum power available at the output of said converter and means for imposing said modulation rate on said modulated signal.

7. The system of claim 6 adapted to be connected to a network wherein said processor imposes a rate of modulation of the signal giving, at the output of the converter, an A.C. voltage of amplitude, frequency and phase at least approximately equal to those of the A.C. voltage of the network and an A.C. current of maximum intensity, taking into account the value of this A.C. output voltage of the converter.

8. The system of claim 7, wherein the modulator receives, as modulation signal, the A.C. voltage of the network.

9. The system of claim 6, wherein the converter is of the type with chopping by electronic elements of controlled conduction and comprises at its output filtering means and transformer adjusting the shape and amplitude of the A.C. output voltage.

10. The system of claim 7, wherein the processor calculates by iteration a reference current which it imposes as output current on the converter by adjustement of the rate of modulation of the control signal of the converter.

* * * * *

UNITED STATES PATENT AND TRADEMARK OFFICE
CERTIFICATE OF CORRECTION

PATENT NO. : 4,390,940
DATED : June 28, 1983
INVENTOR(S) : RENE CORBEFIN ET AL.

It is certified that error appears in the above-identified patent and that said Letters Patent are hereby corrected as shown below:

Col. 4, lines 46-47, "$\overline{PWM}$ is greater...pulses PWM", should be --PWM is greater...pulses $\overline{PWM}$--.

Signed and Sealed this

Twentieth Day of December 1983

[SEAL]

Attest:

GERALD J. MOSSINGHOFF

Attesting Officer  Commissioner of Patents and Trademarks